United States Patent [19]
Weick et al.

[11] Patent Number: 5,811,753
[45] Date of Patent: Sep. 22, 1998

[54] LASER MACHINE TOOL WITH GAS FILLED BEAM DELIVERY CONDUIT

[75] Inventors: Jürgen-Michael Weick, Asperg; Thomas Möhler, Eberdingen, both of Germany

[73] Assignee: Trumpf GmbH & Co., Ditzingen, Germany

[21] Appl. No.: 667,988

[22] Filed: Jun. 19, 1996

[30] Foreign Application Priority Data

Jun. 19, 1995 [DE] Germany ......................... 295 09 648.9

[51] Int. Cl.⁶ .................................................. B23K 26/00
[52] U.S. Cl. ............................... 219/121.78; 219/121.67; 219/121.84
[58] Field of Search ........................... 219/121.6, 121.67, 219/121.78, 121.84

[56] References Cited

U.S. PATENT DOCUMENTS

| | | | |
|---|---|---|---|
| 3,885,927 | 5/1975 | Sherman et al. | 95/139 |
| 4,550,240 | 10/1985 | Toida et al. | |
| 4,661,680 | 4/1987 | Swensrud | 219/121.78 |
| 4,895,144 | 1/1990 | Cook et al. | |
| 5,559,584 | 9/1996 | Miyaji et al. | 355/73 |

FOREIGN PATENT DOCUMENTS

| | | |
|---|---|---|
| 4006148C2 | 9/1990 | Germany. |
| 58-121692 | 7/1983 | Japan. |
| 59-54484 | 3/1984 | Japan. |
| 63-299884 | 12/1988 | Japan ................................ 219/121.84 |
| 2-235012 | 9/1990 | Japan. |
| 3-151185 | 6/1991 | Japan. |
| 5-84590 | 4/1993 | Japan. |
| 680990A5 | 9/1990 | Switzerland. |
| 95/33594 | 12/1995 | WIPO. |

*Primary Examiner*—Gregory L. Mills
*Attorney, Agent, or Firm*—Pepe & Hazard LLP

[57] ABSTRACT

A laser machine tool includes a laser beam generator (3) and a machining head (5), and the laser beam (2) passes between the laser beam generator (3) and the machining head (5) in a beam passage (25) that is at least partially closed. The beam passage (4) is filled with air with a limited $CO_2$ content. In this way, the laser beam (2) in the beam passage is protected at low cost from the influence of gases that reduce its power, especially when the path of the beam is very long.

6 Claims, 2 Drawing Sheets

LASER MACHINE TOOL WITH GAS FILLED BEAM DELIVERY CONDUIT

BACKGROUND OF THE INVENTION

The invention concerns a laser tooling machine with a laser beam generator and a machining head between which the laser beam runs in a beam delivery passage that is at least partially closed and filled with gas.

According to the invention, the power of the laser beam such machine tools is affected by gases and vapors that are in the path of the beam, and which are of certain compositions, especially carbon hydrogen compounds. The tendency for a reduction in the power of the laser beam in the beam's path from the laser generator to the machining head is avoided in the known machine tools by providing a beam delivery passage filled with gaseous nitrogen. Within this beam delivery passage, the laser beam runs protected from the influence of gaseous substances that can reduce its power. The nitrogen gas used serves to keep the path of the laser beam free of hazardous volatile substances, especially the carbon hydrogen compounds mentioned.

But the disadvantage in using nitrogen is its cost. Past attempts to use air in the beam delivery passage instead of nitrogen or another pure gas to save money have frequently only resulted in unsatisfactory beam power at the machining head and accordingly unacceptable machining results, especially with longer beam paths. The object of the present invention is to provide a laser machine tool in which the laser beam is protected from the deleterious influence of gases that reduce its power at a low cost, especially when the beam path is very long.

SUMMARY OF THE INVENTION

The invention solves this task by filling the beam delivery passage with air having a certain $CO_2$ content. Surprisingly, it was found that the reduction in the power of the laser beam frequently reported when air is used in the beam delivery passage can be avoided if the $CO_2$ content of the air in the beam delivery passage is as low as possible. As a result, according to the present invention, machines can stop using expensive gases like nitrogen, and instead use inexpensive air which can be treated at low cost before it is introduced into the beam delivery passage.

One preferred form of embodiment of the laser tooling machine in the invention is characterized by the fact that the air in the beam positioning space has a $CO_2$ content of less than 300 ppm. Practical trials have shown that no notable reduction in the power of the laser beam occurs with a concentration of this amount in the beam delivery passage, even when the path of the laser beam is very long, especially when the laser beam path is more than 12 meters.

In the sense of the invention it is basically conceivable to have a gas-tight beam delivery passage filled with an appropriate composition of air. However, this requires measures for sealing the machine which are structurally relatively demanding. To simplify its design, therefore, the invention provides a version where the beam delivery path can be supplied with air with a certain $CO_2$ content through an air intake device.

The air intake device is equipped, for this purpose, with at least one preferably adjustable aeration device, especially a pump. The latter is adjustable especially with regard to the air pressure produced by it. In this way, the amount of air fed into the beam positioning space can be regulated.

In cases where it has been established that the air to be fed to the beam positioning space already meets the condition described for $CO_2$ concentration in its initial state, the untreated air can be introduced directly into the beam positioning space. In cases where the composition of the air deviates from this, the beam delivery passage can be aerated by a device for adjusting the $CO_2$ content of the air fed into the beam delivery passage.

The device used to adjust the $CO_2$ content in the invention has at least one molecular sieve, by means of which the $CO_2$ content of the air fed into the beam delivery passage can be adjusted to values below a predetermined limit, especially to a concentration under 300 ppm.

Alternatively or in addition to at least one molecular sieve, the device for adjusting the $CO_2$ content in another embodiment of the machine of the present invention has at least one gas scrubber, by means of which the $CO_2$ content of the air fed to the beam positioning space can be adjusted to values below a predetermined limit, especially to a concentration below 300 ppm. Both when the molecular sieve is used and when the gas scrubber is used, it is usually desirable that the moisture of the air fed into the gas delivery passage being prepared with regard to its $CO_2$ content does not exceed certain limits. Experience shows that when there is an amount of moisture in the air which exceeds certain limits inside the beam delivery passage, it has a negative effect on the power of the laser beam. One way of influencing the amount of moisture in the treated air is to employ gas dryers, by means of which air can be treated to reduce its moisture content to the extent desired. Molecular sieves are generally connected to the input side of such gas dryers and gas scrubbers are generally connected on the output side.

The air to be fed into the beam positioning space comes from various sources, according to the present invention.

Thus, one version of the invention provides that the beam delivery passage be connected to another otherwise closed container for the air fed into it. This reserve air container can contain air whose composition meets the requirements set for the $CO_2$ content. In this case, the air from the reserve container can be fed directly into the beam positioning space. Alternately, it is also possible to fill the reserve container with air whose $CO_2$ content is over the predetermined limit. This air is then introduced into the beam delivery passage through the device for adjusting $CO_2$ content mentioned above. The air inside the reserve container is always under superatmospheric pressure, so that, after a valve is opened, it flows right into the beam delivery passage. If the air in the reserve container is not pressurized, it can be moved with assistance in the form of a pump and fed into the beam delivery passage. In each case, the air stored in the reserve container is characterized by a uniform $CO_2$ concentration. This guarantees that, when air is introduced directly into the beam delivery passage, it is filled with an atmosphere with a uniform $CO_2$ concentration; if the $CO_2$ content of the air in the reserve container exceeds the predetermined limit and this air must be treated accordingly before being introduced into the beam delivery passage, it is desirable that air with a uniform, constant composition is fed to the $CO_2$ adjusting device which is then used to adjust the $CO_2$ content. The device for adjusting the $CO_2$ content can be operated under constant conditions.

One preferred form of the laser machine tool of the present invention provides for the beam delivery passage to be connected to the atmosphere. Air coming from the atmosphere can be introduced directly into the beam delivery passage at the corresponding $CO_2$ concentration. If the $CO_2$ concentration of the atmospheric air is over the relevant limit, the $CO_2$ content can be adjusted accordingly by means of a device provided for this purpose before the air is introduced into the beam delivery passage according to the requirements.

One preferred, structurally simple design of an embodiment of the laser machine tool of the present invention is characterized by the fact that the beam delivery passage is connected in close proximity to the laser machine tool via the air feed device.

In one form of the machine of the present invention in which the machining head is relatively moveable in relation to the laser beam generator, the beam positioning space has a constant volume relative to the laser beam generator for this purpose when the tooling head moves. Regardless of the momentary position of the machining head in relation to the laser beam generator, a constant amount of air can be fed to the beam delivery passage of such machines. The $CO_2$ concentration inside the beam delivery passage also remains unchanged when the machining head is moving.

In this sense, one advantageous version of the invention provides for the walls of the beam to consist of segments, at least two of which are arranged on both sides of a laser beam outlet in the passage so they can move in relation to it in the direction of movement of the machining head; the effective length of the segments arranged on one side of the laser beam outlet in the direction of movement of the machining head is reduced by its movement to the same extent that the effective length of the segments arranged on the opposite side of the laser beam outlet are increased with the movement of the machining head.

It has proven worthwhile in this connection to design the walls of the beam delivery passage as a bellows with segments in the form of round folds.

Another preferred form of embodiment of the laser machine tool of the invention is one in which the machining head can move relative to the laser beam generator in two directions which are perpendicular to one another, and which is characterized by the fact that the beam delivery passage has a first part that runs in one direction of movement of the machining head and consists of segments arranged on both sides of a first laser beam outlet that can move in the one direction of movement of the machining head, and a corresponding second part connected to the laser beam outlet of the first part in the other direction of movement of the machining head. In the second part, the tooling head has a second laser beam outlet that can move in the other direction of movement. In such a machine, the machining head can run in the plane defined by its two directions of movement with different volumes in the two portions of the beam delivery passage.

BRIEF DESCRIPTION OF THE DRAWINGS

The invention will be described below using schematic drawings of examples of embodiment.

DETAILED DESCRIPTION OF THE PREFERRED EMBODIMENTS

Figure 1:
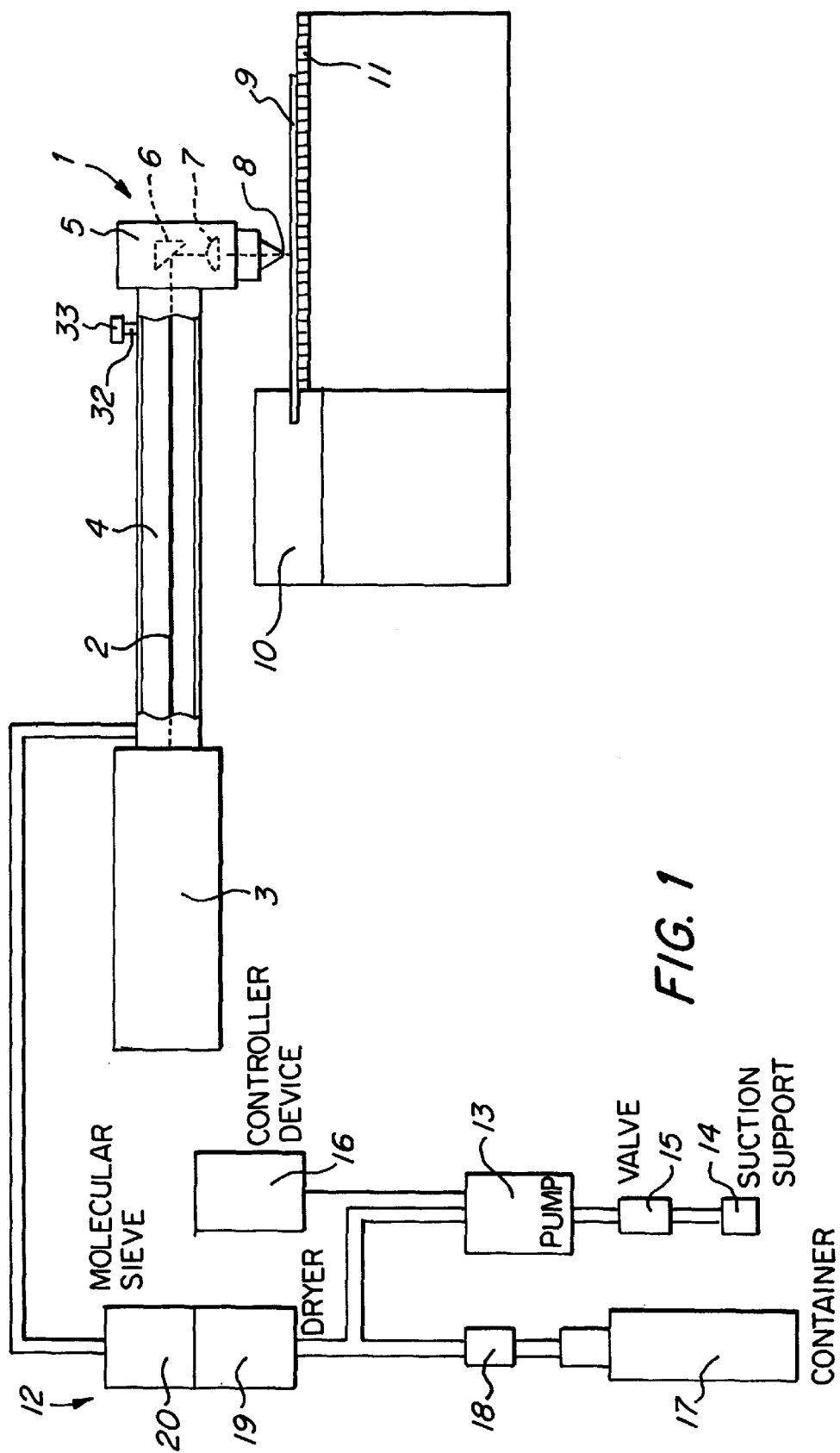
FIG. 1 is a diagrammatic illustration of a first embodiment of a laser cutting machine with the beam delivery passage filled with air.

According to FIG. 1, a laser beam 2 in a laser cutting machine 1 proceeds along a path from a laser beam generator 3 inside a beam delivery passage designed as a beam delivery tube 4, before it enters a machining head in the form of a cutting head 5 on the end of the beam delivery tube 4 spaced from the laser generator 3. The laser beam 2 is deflected in the direction of a focusing device 7 by means of a deflection mirror 6 inside the cutting head 5 and is focused by it through a nozzle 8 onto a sheet of metal 9 to be machined by cutting.

The cutting head 5 remains stationary while the sheet metal 9 is being machined. The latter is clamped on a coordinate feed apparatus so that it can be moved relative to the cutting head 5 in a plane running perpendicular to the plane of projection and it is mounted on a workpiece support 11.

The beam delivery tube 4 is filled with air containing $CO_2$ in a concentration of less than 300 ppm. This air is used to flush the beam positioning tube 4 and thereby remove gases affecting the power of the laser beam 2. The air is introduced by means of an air feed device 12.

The air feed device includes, on one hand, a pump 13 used to draw and convey air, by means of which atmospheric air close to the laser cutting machine 1 is drawn through an air inlet in the form of a suction support 14 and a valve 15, and the air can be conveyed to the beam delivery tube 4. The pressure on the outlet side of the pump 13 is adjusted by a control device 16.

As an alternate to providing the air from the surrounding atmosphere, the beam delivery tube 4 can be filled with air from a container 17. The air in the container 17 is under superatmospheric pressure and can be fed to the beam delivery tube 4 accordingly without additional aid via a valve 18 coupled to the container 17.

Both the air drawn from the atmosphere surrounding the laser cutting machine 1 and the air coming from the container 17 are fed to the beam delivery tube 4 via a gas dryer 19 and a device 20 connected on the output side of the dryer 19 in the direction of the air flow to adjust the $CO_2$ content of the air being conveyed. A molecular sieve is used to adjust the $CO_2$ content; it reduces the $CO_2$ concentration to a value under 300 ppm by filtering out the $CO_2$ molecules from the stream of raw air. For regeneration, the molecular sieve can be rinsed with air in the opposite direction of the flow after a predetermined operating time or after treatment of a predetermined amount of air. The gas dryer 19 is used to reduce the water content of the stream of air being conveyed. Next to the cutting head 5 on the beam positioning tube 4, there is an outlet hole 32 for the air flowing through the inside of the beam positioning tube 4. With the help of an adjustable outlet filter 33 on the outlet hole 32, the amount of air coming out or the excess pressure inside the beam delivery tube 4 can be regulated.

Figure 2:
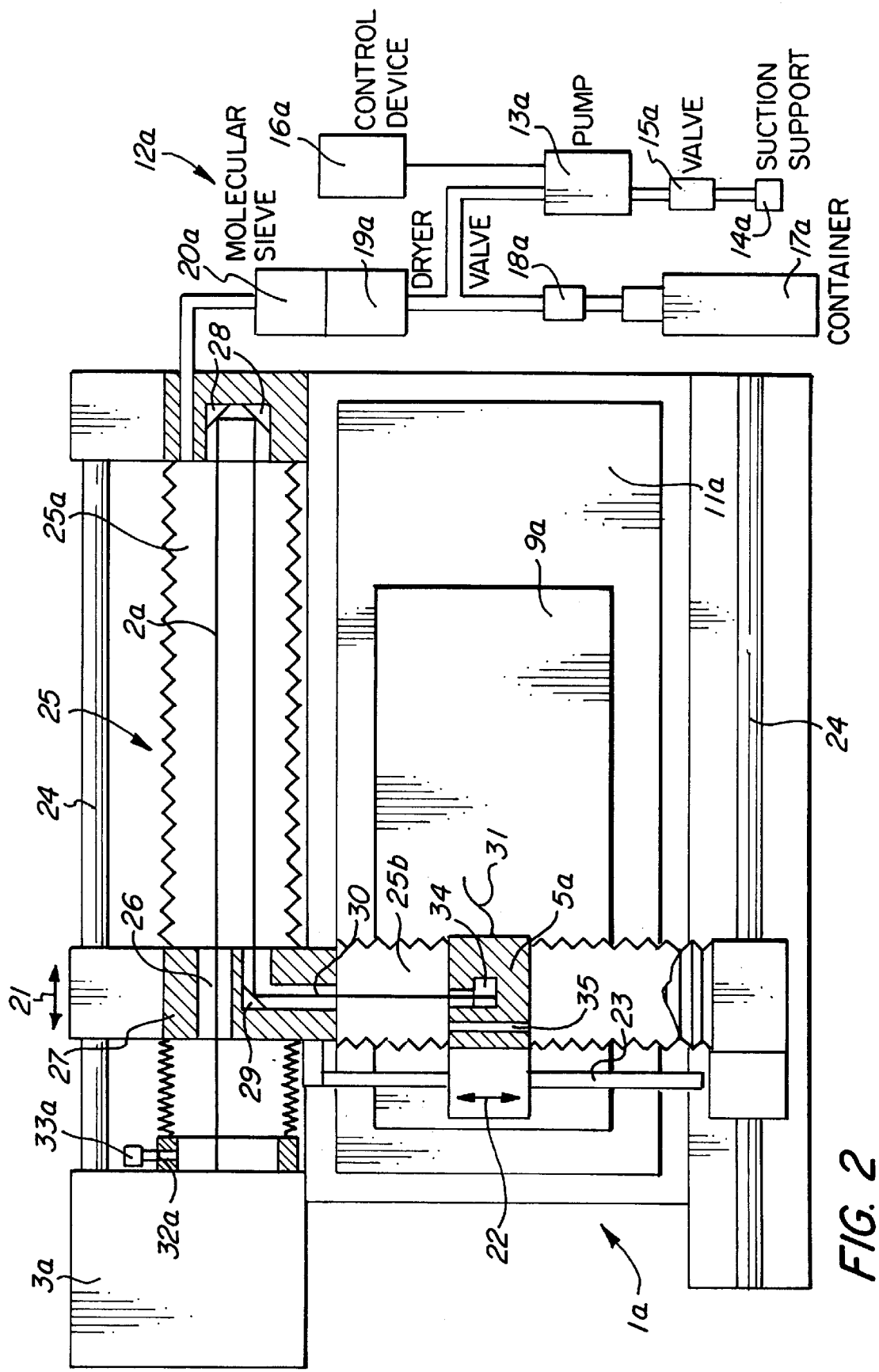
FIG. 2 is a diagrammatic illustration of a second embodiment of a laser cutting machine with the beam delivery passage filled with air.

In the laser cutting machine 1a shown in FIG. 2, a machining head 5a designed as a cutting head can be moved relative to a laser beam generator 3a in two directions perpendicular to one another as shown by the double arrows 21, 22. The cutting head 5a is moved in the direction of the double arrow 22 on a cross guide 23. This can in turn be moved in the direction of the double arrow 21 along two longitudinal guides 24 parallel to one another. A piece of sheet metal 9a is mounted and held in place on a workpiece support 11a during the machining process.

A laser beam 2a from the laser generator 3a is deflected to the cutting head 5a through a beam delivery passage that is defined by a two part bellows 25. The laser beam 2a first goes through a beam passage 26 on a branch 27 of a machine cross member before it is deflected twice at right angles by means of a first deflection mirrors 28 and reflected to second deflection mirror 29 on the branch 27. From the second deflection mirror 29, the laser beam 2a finally goes through the first laser beam outlet 30 in the branch 27 to the cutting head 5a, where it is redirected towards the sheet metal 9a by another 90 degree deflection mirror (not shown). The laser beam 2a thereby goes through a second laser beam outlet 34 in the cutting head 5a onto the surface of the sheet metal 99. The second laser outlet 34 is concealed by the parts of the cutting head 5a lying over it in FIG. 2. A cutting track 31 is made as the beam 2a exiting the cutting head 5a is moved over the sheet metal 9a as shown in FIG. 2.

The cutting head 5a can be moved in the direction of the double arrow 21 on cross pieces 24 provided for supporting the branch 27. The first part 25a of the bellows generally designated by the numeral 25 also runs in this direction. Segments of the first part 25a of the enclosing bellows 25 thus are closed on both sides on the branch 27 and thus on both sides of the first laser beam outlet 30. A second part 25b of the enclosing bellows 25 extends from the laser beam outlet 30 of the branch 27 in the direction of the double arrow 22. This second part 25b of the enclosing bellows 25 also has two sections which are separated by the cutting head 5a with its laser beam outlet 34 pointed at the sheet metal 9a.

Air is admitted to the enclosing bellows 25 via an air feed device 12a; its $CO_2$ content is less than 300 ppm. The design of the air feed device 12a is identical to the design of the air feed device 12 in FIG. 1. Devices corresponding to the structural elements of the air feed device 12 in FIG. 1 are identified in FIG. 2 using the reference numbers assigned to them in FIG. 1 with the letter "a" added thereafter.

The air introduced into the enclosing bellows 25 by means of the air feed device 12a fills both the first part 25a and the second part 25b of the bellows 25. The air exits through an outlet 32a, and the amount of air coming out and the superatmospheric pressure inside the bellows 25 can be adjusted by means of an adjustable outlet filter 33a. The sections of the enclosing bellows 25 arranged on both sides of the branch 27 and the cutting head 5a are connected to one another via the beam passage 26 and an air compensation passage 35.

Now, if the cutting head 5a moves in the direction of the double arrow 21, the effective length of the segments of the first part 25a of the enclosing bellows 25 arranged on the side of the branch 27 lying in the direction of movement is shortened to the same extent that the effective length of the segments arranged on the opposite side of the branch 27 is increased. As a result, the first part 25a of the enclosing bellows 25 has a constant volume, regardless of the momentary position of the cutting head 5a in the direction of the double arrow 21. The same is true of the volume of the second part 25b of the enclosing bellows 25. Namely, if the cutting head 5a moves along the cross guide 23 in the direction of the double arrow 22, the section of the bellows 25 on one side of the cutting head 5a is shortened to the same extent that the section of the bellows 25 on the opposite side of the cutting head is lengthened. The volume within the enclosing bellows 25 is thus totally independent of the position of the cutting head 5a in a horizontal plane defined by the double arrows 21, 22, for movement of the cutting head 5a along the cross guide 23 and along the members 24.

What is claimed is:

1. A laser machine tool including (a) a laser beam generator (3, 3a); (b) a machining head (5, 5a) reciprocally movable in two orthogonal directions relative to said laser beam generator; (c) a beam delivery passage (4, 25) in which a laser beam (2, 2a) passes between said laser beam generator (3, 3a) and said machining head (5, 5a), said beam delivery passage having two orthogonal portions (25a, 25b), one of which is movable along the length of the other, said one portion (25b) of said beam delivery passage comprising segments arranged on both sides of a first laser beam outlet (34) and movable along one of said directions of movement (22) of said machining head (3, 3a) and the other of said portions comprising of segments on both sides of a second laser beam outlet (30) and movable along the other of said directions of movement (21), said beam delivery passage being partially closed and filled with gas comprising air with a controlled $CO_2$ content of less than 300 ppm; and (d) an air feed device connected to the atmosphere and to said beam delivery passage for continuously supplying to said passage air with a controlled $CO_2$ content of less than 300 ppm. said air feed device including a molecular sieve for reducing the $CO_2$ content of the air from the atmosphere supplied to said beam delivery passage.

2. The laser machine tool according to claim 1, wherein said air feed device (12, 12a) has at least an adjustable aeration device.

3. The laser machine tool according to claim 1 wherein said air supply device (20, 20a) for adjusting the $CO_2$ content also includes gas scrubber, by means of which the $CO_2$ content of the air fed into said beam delivery passage (4, 25) can be adjusted to a concentration below 300 ppm.

4. The laser machine tool according to claim 1 wherein said machining head (5, 5a) is movable relative to said laser beam generator (3, 3a) and said beam delivery passage (4, 25) has a constant volume when said machining head (5, 5a) moves relative to said laser beam generator (3, 3a).

5. The laser machine tool according to claim 1 wherein walls defining said segments of said beam delivery passage (25) are expansible, said segments being movable relative to said head so that the length of the segments on one side of said outlets is reduced to the same extent that the length of the segments on the opposite side of the laser beam outlets (30, 34) is increased when said machining head (5a) moves.

6. The laser machine tool according to claim 5 wherein said segments of said walls of said beam delivery passage are provided by bellows (25).

* * * * *